(12) United States Patent
Liu et al.

(10) Patent No.: US 8,251,332 B2
(45) Date of Patent: Aug. 28, 2012

(54) SUPPORT STAND FOR FLAT-PANEL DISPLAY MONITOR

(75) Inventors: Zhi-Bin Liu, Shenzhen (CN); Xue-Ming Chen, Shenzhen (CN); Jun-Wu Duan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 365 days.

(21) Appl. No.: 12/691,877

(22) Filed: Jan. 22, 2010

(65) Prior Publication Data

US 2011/0114804 A1    May 19, 2011

(30) Foreign Application Priority Data

Nov. 17, 2009    (CN) .......................... 2009 1 0309851

(51) Int. Cl.
*A47B 91/00*    (2006.01)
*A47G 29/00*    (2006.01)
*B65D 19/00*    (2006.01)

(52) U.S. Cl. .............. 248/346.04; 248/346.01; 248/917; 248/923

(58) Field of Classification Search ............. 248/346.04, 248/346.01, 349.06, 349.1, 179.1, 371, 917, 248/923, 121, 346.03
See application file for complete search history.

(56) References Cited

U.S. PATENT DOCUMENTS

| | | | | |
|---|---|---|---|---|
| 6,010,111 | A * | 1/2000 | Cho | 248/346.06 |
| 6,941,618 | B2 * | 9/2005 | Kim | 16/337 |
| 7,175,144 | B2 * | 2/2007 | Yen et al. | 248/221.11 |
| 7,274,556 | B2 * | 9/2007 | Chung | 361/679.27 |
| 7,518,855 | B2 * | 4/2009 | Chu | 361/679.22 |
| 7,710,510 | B2 * | 5/2010 | Chin | 349/60 |

* cited by examiner

*Primary Examiner* — Amy J. Sterling
(74) *Attorney, Agent, or Firm* — Altis Law Group, Inc.

(57) ABSTRACT

A support stand includes a bracket and a base connected with the bracket. The bracket includes a main body, a movable member, and a resilient member. The main body defines a receiving slot therein, and the movable member is partially received in the receiving slot, with opposite ends of the resilient member resisting the main body and the movable member. The base includes a latching member sleeved on the main body of the bracket. The latching member includes a latching portion for impelling and guiding the movable member to be received in the receiving slot of the main body, and the movable member to contact the resilient member. After the movable member passes over the latching portion, an elastic force created by the resilient member extends the movable member from the receiving slot of the main body, and the movable member is latched in the base.

15 Claims, 6 Drawing Sheets

SUPPORT STAND FOR FLAT-PANEL DISPLAY MONITOR

BACKGROUND

1. Technical Field

The present disclosure generally relates to display devices and, particularly, to a support stand for a flat-panel display monitor.

2. Description of Related Art

A liquid crystal display monitor often includes a monitor and a support stand. A support stand often includes a bracket and a base for supporting the monitor and adjusting the angle or height of the monitor. The bracket and the base are often detachable to occupy minimal space and ease transport.

A commonly used bracket often defines a slot, and the base includes a hook. The bracket and the base are assembled by the slot receiving the hook. However, since, during assembly, the hook is resiliently moved to be received in the slot of the bracket, whereby the hook must be sufficiently elastic to be able to resiliently move, and thereby may provide insufficient rigidity to ensure firm connection between the base and the bracket.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
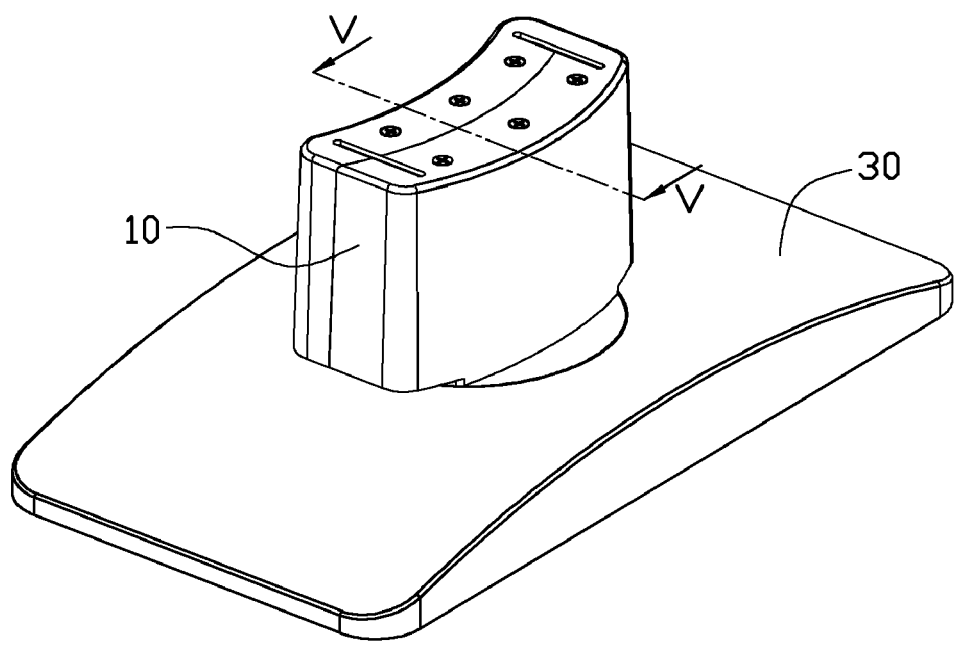
FIG. 1 is an assembled, isometric view of a support stand as disclosed, including a bracket and a base.

Referring to FIG. 1, an embodiment of a support stand 100 includes a bracket 10 and a base 30 connected to the bracket 10. The support stand 100 as disclosed may be used with a flat-panel display.

Figure 2:
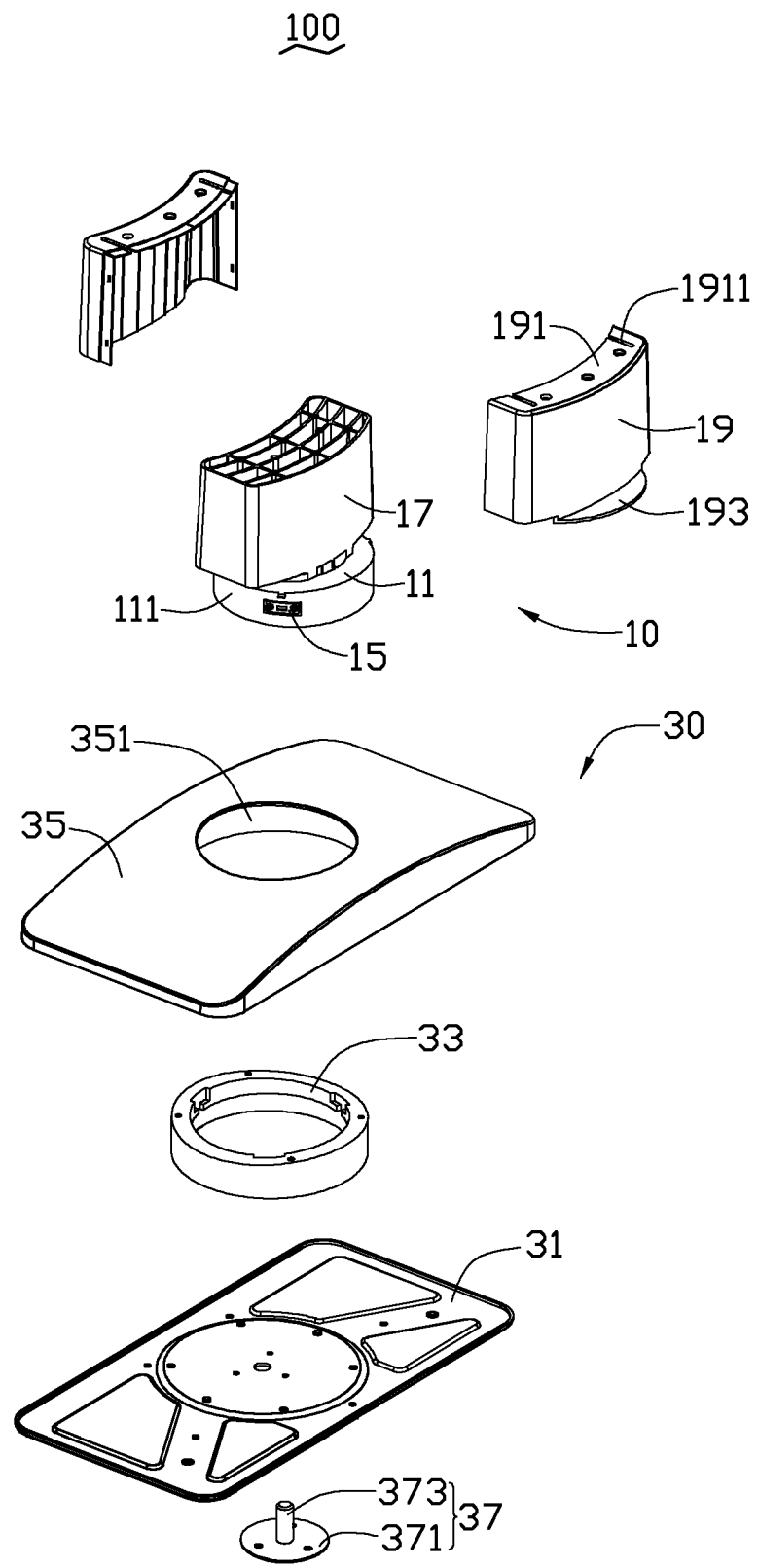
FIG. 2 is an exploded, isometric view of the support stand of FIG. 1.
Figure 3:
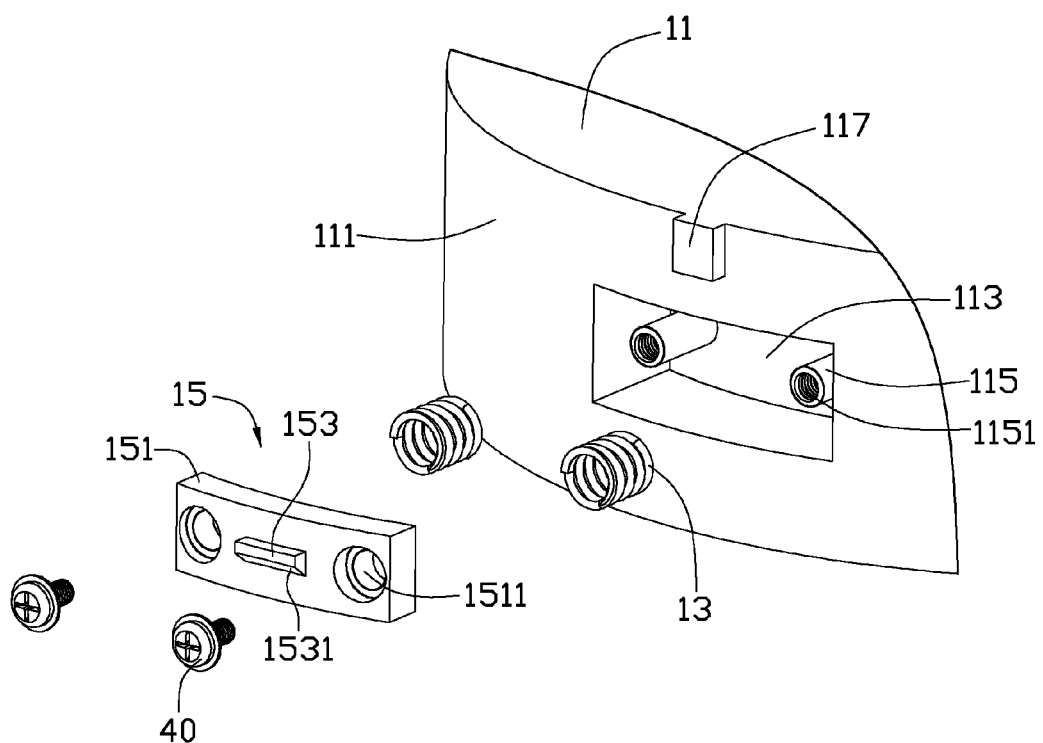
FIG. 3 is an exploded, isometric view of part of the support stand of FIG. 2.

Referring to FIGS. 2 and 3, the bracket 10 includes a main body 11, two resilient members 13, a movable member 15, a support portion 17, and a shell 19 on the outside of the support portion 17.

The main body 11 has an outer surface 111, a receiving slot 113, two guide bars 115, and a restricting protrusion 117. The restricting protrusion 117 extends from the outer surface 111, and the receiving slot 113 is defined from the outer surface 111 into the interior of the main body 11. The guide bars 115 are substantially parallel and received in the receiving slot 113. The guide bar 115 includes an inner fastener hole 1151. The restricting protrusion 117 is opposite to the receiving slot 113. In the illustrated embodiment, there are three receiving slots 113, three restricting protrusions 117, and six guide bars 115 in total; and the restricting protrusions 117 and the receiving slot 113 are substantially arranged around the main body 11. Correspondingly, the total number of the resilient members 13 is six, and the total number of the movable members 15 is three, wherein each receiving slot 113 receives two resilient members 13 and one movable member 15. In other embodiments, the total number of receiving slots 113, restricting protrusions 117, and guide bars 115 may be one, two, four, and others. One guide bar 115 and one resilient member 13 can be received in one receiving slot 113.

The movable member 15 includes a slider 151 and a resisting portion 153 protruding from the slider 151. The slider 151 defines two connecting holes 1511 for receiving the guide bars 115, respectively. The slider 151 is received in the receiving slot 113, and the resisting portion 153 is protruded from the outer surface 111 of the main body 11. The resisting portion 153 has a resisting surface 1531 at a particular tilted angle with respect to the outer surface 111 of the main body 11.

Each resilient member 13 sleeves on one guide bar 115. Opposite ends of each resilient member 13 resist the main body 11 and the movable member 15, respectively.

Each slider 151 defines two connecting holes 1511 with the resisting portion 153 arranged therebetween the connecting holes 1511. A plurality of fasteners 40 extend through the connecting holes 1511 of the slider 151 and are received in the inner fastener holes 1151 of the guide bar 115 to connect the movable member 15 and the guide bar 115, respectively. The slider 151 is received in the receiving slot 113 of the main body 11, and the resisting portion 153 is extended outside of the receiving slot 113.

The shell 19 has a connecting end 191 and a covering portion 193. The connecting end 191 defines a connecting slot 1911.

The base 30 includes a support plate 31, a latching member 33, a protective cover 35, and a connecting member 37.

Figure 4:
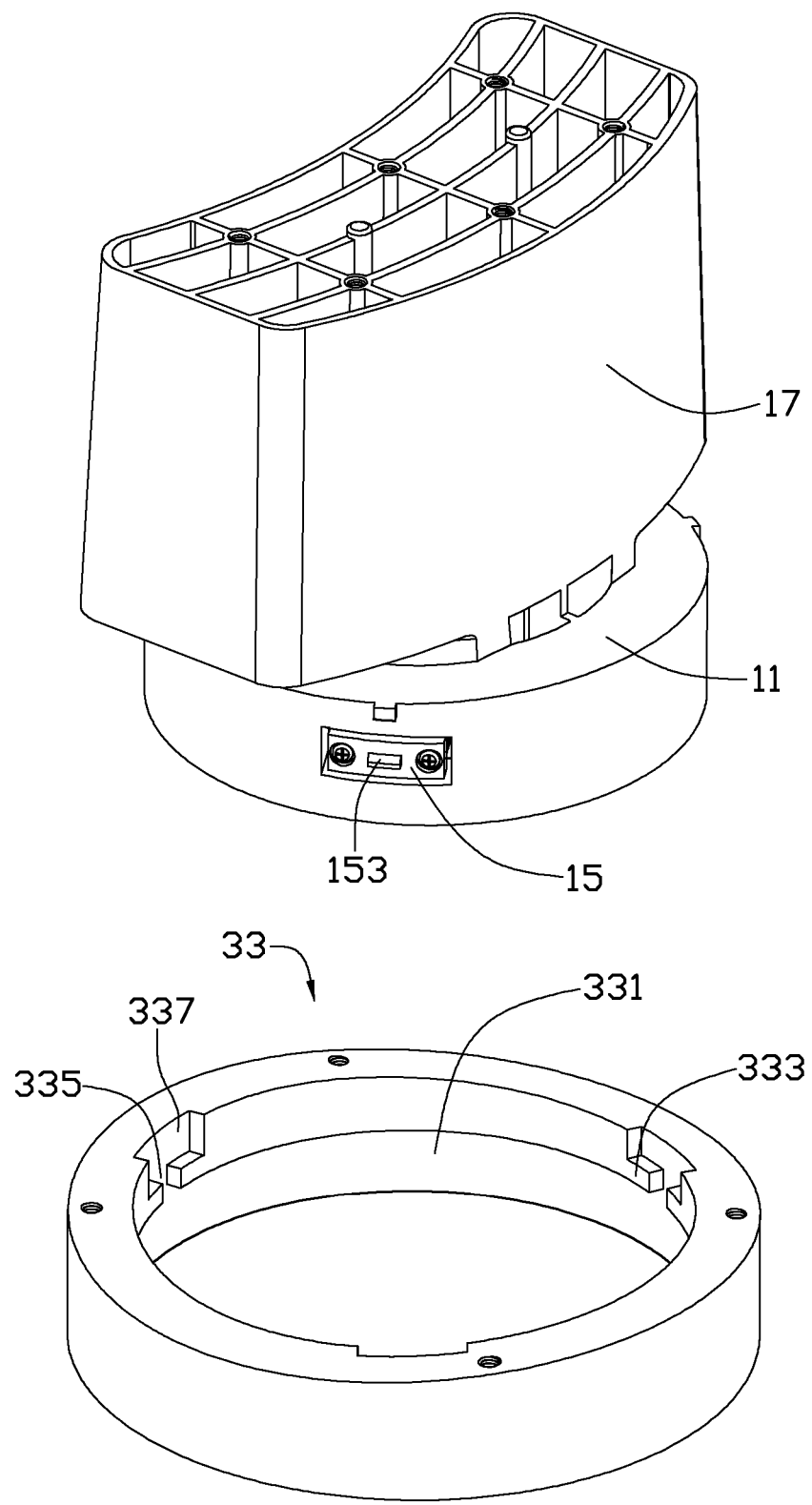
FIG. 4 is an assembled, isometric view of part of a latching member of the support stand of FIG. 2.
Figure 5:
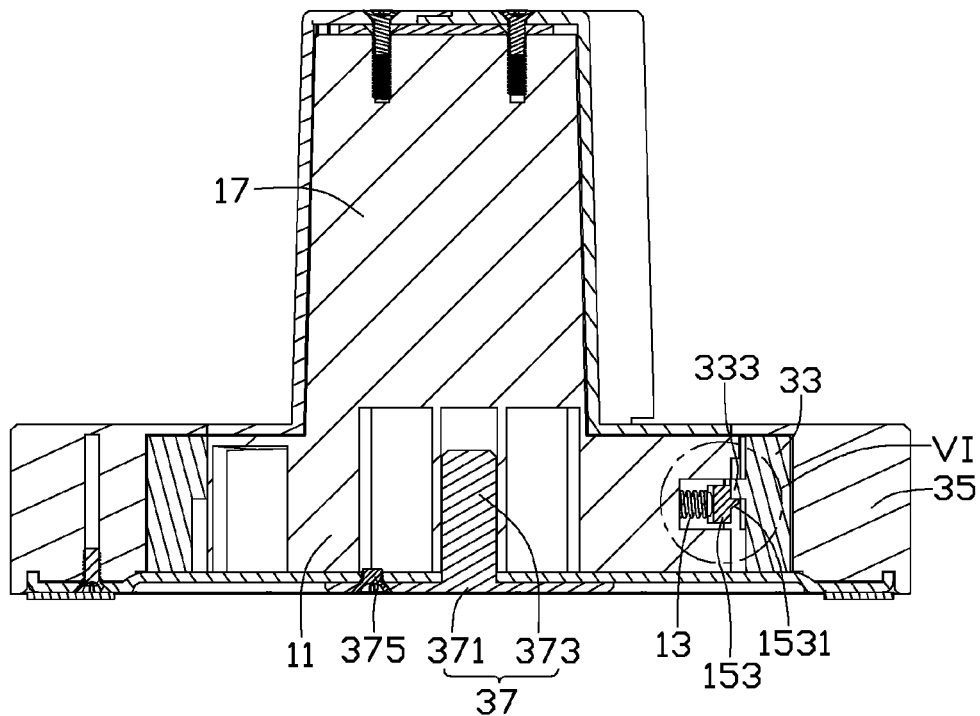
FIG. 5 is a cross-section of the support stand of FIG. 1 taken along line V-V.
Figure 6:
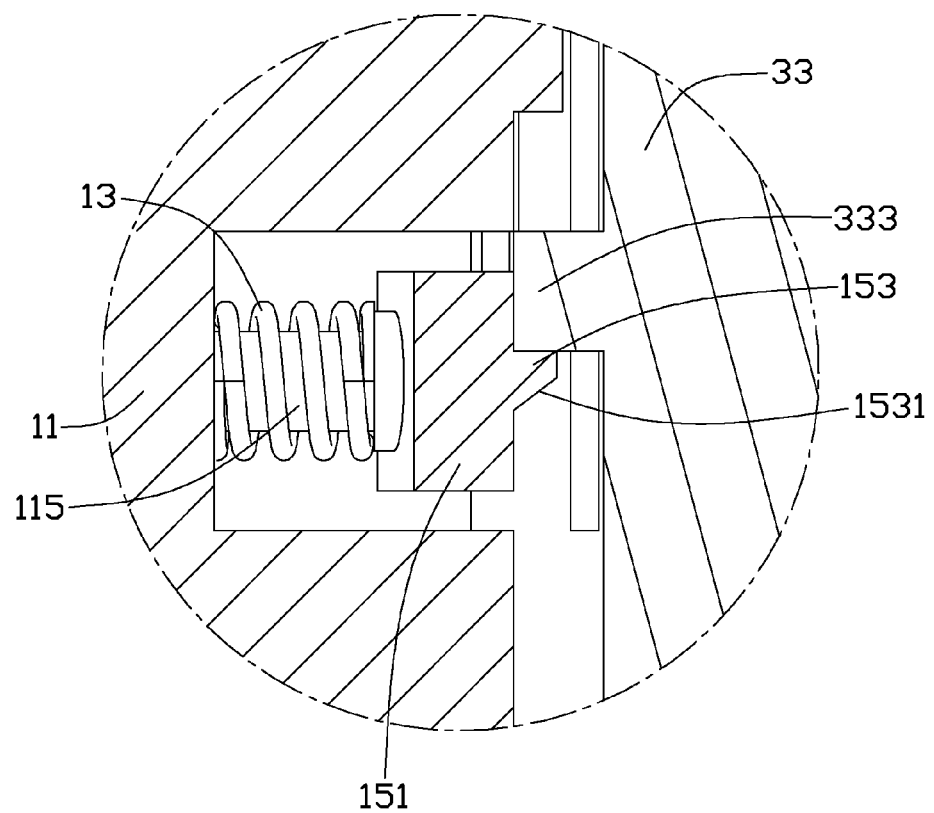
FIG. 6 is an enlarged view of part VI of FIG. 5.

Referring to FIGS. 2 through 4, the latching member 33 is a hollow cylinder with an inner surface 331 and a latching portion 333 protruding from the inner surface 331. The latching portion 333 defines a passing slot 335 and a restricting slot 337 substantially parallel to the axis of the latching member 33. The restricting slot 337 communicates with the passing slot 335. The restricting slot 337, disposed along the circumference of the latching member 33, is wider than the passing slot 335, disposed along the circumference of the latching member 33. As shown, three passing slots 335 correspond to three restricting slots 337. The passing slot 335 and the restricting slot 337 are arranged around the latching member 33. In other embodiments, the total number of passing slots 335 and restricting slots 337 may also be one, two, four, and others, corresponding to the total number of movable members 15.

The protective cover 35 defines a through hole 351 of a diameter substantially the same as that of the main body 11 of the bracket 10.

The connecting member 37 includes a base body 371 and a connecting bar 373 protruding from a middle portion of the base body 371.

Referring to FIGS. 2 through 6, during assembly of the bracket 10 and the base 30 of the support stand 100, the latching member 33 connects with the support plate 31, the latching member 33 is received in the through hole 351 of the protective cover 35, and the protective cover 35 connects with the support plate 31. The main body 11 of the bracket 10 is received in the latching member 33 of the base 30 and positioned therein. The latching portion 333 of the latching member 33 resists the resisting surface 1531 of the movable member 15. Because of the resisting surface 1531 of the movable member 15 being at a tilted angle with respect to the main body 11, when force applied on the bracket 10 moves the bracket 10 relative to the base 30, the latching portion 333 resists the resisting portion 153, and the slider 151 compresses the resilient member 13, and the slider 151 slides into the receiving slot 113 of the bracket 10. When the resisting portion 153 passes over the latching portion 333, the elastic force created by the resilient member 13 impels the movable member 15 to extend the resisting portion 153 out of the receiving slot 113 of the bracket 10. When the resisting portion 153 of the movable member 15 is guided under the latching portion 333 and is then received in the latching member 33 by the latching portion 333, at this time, the restricting protrusion 117 is located in the restricting slot 337 of the base 30, with the activity areas of the restricting portion 117 equaling the relative rotating angle of the bracket 10 with respect to the base 30. Therefore, the relative rotating angle of the bracket 10 with respect to the base 30 can be adjusted by changing the length of the restricting slot 337 of the base 30. The connecting bar 373 of the connecting member 37 extends through the support plate 31 and the latching member 33 and is received in the main body 11 of the bracket 10. The fasteners 375 extend through the base body 371 of the connecting member 37 and are received in the threaded hole (not shown) of the support plate 31. The shell 19 encloses on the outside of the support portion 17; and the covering portion 193 covers the through hole 351 of the protective cover 35 to prevent entry of foreign objects into the base 30.

During disassembly of the bracket 10 and the base 30, the bracket 10 is rotated until the resisting portion 153 of the movable member 15 is positioned under the passing slot 335 of the base 30. Applying force on the bracket 10 passes the resisting portion 153 over the passing slot 335 and the restricting slot 337 and detaches the bracket 10 from the base 30.

The movable member 15 connects with the main body 11 by the resilient member 13, thus a distance between the movable member 15 and the main body 11 can be adjusted by the elastic deformation of the resilient member 13. The movable member 15 can be of any material with high strength and rigidity, thus the movable member 15 provides improved lifespan and support.

In addition, the bracket 10 can be detached from the base 30 by maneuver the resisting portion 153 to pass over the passing slot 335 and the restricting slot 337, wherein the resilient member 13 does not need to be deformed again, thereby extending service life of the resilient member 13.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A support stand, comprising:
  a bracket comprising a main body connected by at least one resilient member to a movable member; and
  a base comprising a latching member and a passing slot over which the movable member passes to detach from the base, and the latching member is sleeved on the main body;
  wherein the main body defines a receiving slot, and the at least one resilient member is received in the receiving slot; the latching member comprises a latching portion; and when the bracket is received in the base, the latching portion guides the movable member into the receiving slot of the main body and compresses the at least one resilient member; wherein an elastic force created thereby extends the movable member out of the receiving slot, and the movable member is received in the latching member of the base by the latching portion.

2. The support stand of claim 1, wherein the movable member comprises a slider connecting with the resilient member and a resisting portion protruding from the slider.

3. The support stand of claim 2, wherein the resisting portion of the movable member comprises a resisting surface at a tilted angle with respect to the main body.

4. The support stand of claim 2, wherein the bracket further comprises at least one guide bar received in the receiving slot of the bracket; wherein the at least one resilient member sleeves on the at least one guide bar, and the slider defines at least one connecting hole for receiving the guide bar.

5. The support stand of claim 4, wherein the latching member comprises an inner surface from which the latching portion extends, and the passing slot is formed as a depression from the inner surface of the latching member.

6. The support stand of claim 5, wherein a restricting protrusion extends from the main body; and the latching portion of the latching member defines a restricting slot receiving the restricting protrusion.

7. The support stand of claim 1, wherein the base further comprises a support plate and a connecting member; the support plate connects with the latching member; and the connecting member extends through the support plate and the latching member and connects with the bracket.

8. A support stand, comprising:
  a bracket comprising a main body connected by at least one resilient member to a movable member; and
  a base rotatably connecting with the bracket, and the base comprising a latching portion protruding from an inner surface of the base and a passing slot over which the movable member passes to detach from the base;
  wherein the latching portion of the base guides the movable member into the main body to be received in the base and rotate relative thereto; wherein after the movable member passes over the latching portion of the base, an elastic force created by the at least one resilient member extends the movable member out of the main body to be received in the base by the latching portion of the base.

9. The support stand of claim 8, wherein the bracket comprises an outer surface and defines a receiving slot from the outer surface into the inner side of the bracket.

10. The support stand of claim 8, wherein the movable member comprises a slider connecting with the resilient member and a resisting portion protruding from the slider.

11. The support stand of claim 10, wherein the resisting portion of the movable member has a resisting surface at a tilted angle with respect to the main body.

12. The support stand of claim 10, wherein the bracket further comprises at least one guide bar received in the receiving slot of the bracket; the at least one resilient member sleeves on the at least one guide bar; and the slider defines at least one connecting hole receiving the guide bar.

13. The support stand of claim 12, wherein the latching member comprises an inner surface from which the latching portion extends, and the passing slot is formed as a depression from the inner surface of the latching member.

14. The support stand of claim 8, wherein the main body further comprises a restricting protrusion extending from the outer surface of the main body; and the latching portion of the latching member defines a restricting slot receiving the restricting protrusion.

15. The support stand of claim 8, wherein the base further comprises a support plate and a connecting member; the support plate connects with the latching member; and the connecting member extends through the support plate and the latching member and connects with the bracket.

* * * * *